J. E. STUDLEY.
Chain-Hook.
No. 220,506.                    Patented Oct. 14, 1879.
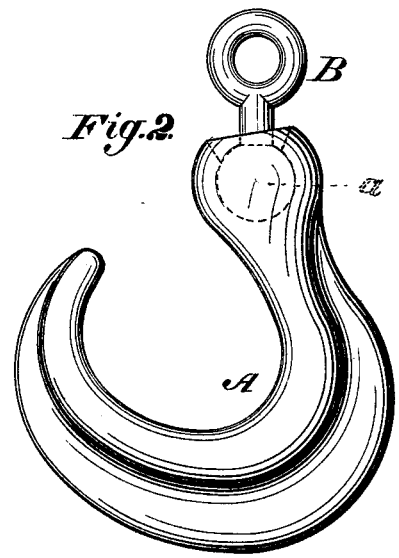
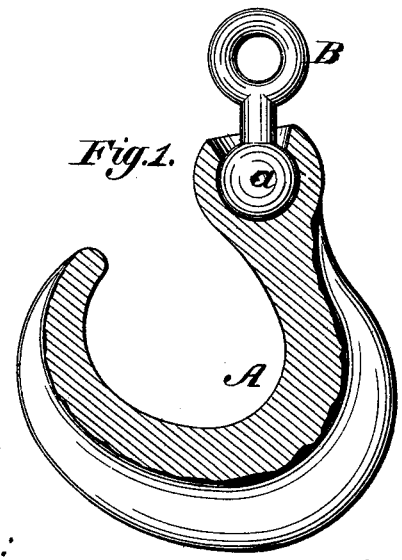
Witnesses:
Donn I. Twitchell
Walter S. Dodge
Inventor:
James E. Studley
By his Att'ys
Dodge & Son

UNITED STATES PATENT OFFICE.

JAMES E. STUDLEY, OF OSHKOSH, WISCONSIN.

IMPROVEMENT IN CHAIN-HOOKS.

Specification forming part of Letters Patent No. 220,506, dated October 14, 1879; application filed August 8, 1879.

*To all whom it may concern:*

Be it known that I, JAMES E. STUDLEY, of Oshkosh, Winnebago county, Wisconsin, have invented a new and Improved Chain-Hook, of which the following is a specification.

The object of my invention is to provide a hook for use on log-chains, and similar purposes, which shall be capable of adjusting itself freely in all directions with reference to the chain, so as to avoid the ordinary kinking and twisting of the latter, and the consequent lateral strains which so frequently result in the breakage of the hook and chain; and to this end the invention consists in a hook made in two parts—a hook proper and an eye or link—united by means of a ball formed on one part and seated and confined directly in a recess in the other part without the employment of additional parts or pieces.

Figure 1 represents a side view of my improved hook; Fig. 2, a longitudinal central section of the same.

A represents the hook proper, which may be made in any desired form, provided with a spherical cavity or recess in its end, as shown in Fig. 2. B represents the link or eye piece, having at one end an eye or ring, and at the other a round neck, which terminates in a spherical head, $a$, which is seated loosely in the recess in the end of the hook, and confined therein by the latter being extended above and contracted over the center or equator of the ball, as shown, the arrangement being such that the hook is permitted to rotate and tip freely in all directions with reference to the hook, while at the same time the connection is such that there is no danger of the parts being separated by any other than a breaking-strain. The parts are both made ordinarily of malleable iron, and united by casting one upon the other, one of the parts being made before the other and placed in the mold after first receiving a coating of plumbago or similar material, by which the adhesion of the parts is prevented.

The parts may, however, be cast separately, and united by compressing and reducing the end of the hook over the ball by means of a die.

A hook consisting of the two parts constructed and united as above described is exceedingly cheap and strong, and, owing to its capability of adjustment in all directions, is far superior to those constructed in the ordinary manner.

I am aware that swivel-joints and ball-and-socket joints are old, and that they have been used in many places, and I lay no claim thereto; but What I do claim is—

1. As an improved article of manufacture, the herein-described chain-hook, consisting of two parts, the hook proper and the eye B, the latter secured to the hook by a ball-joint, as shown and described.

2. The malleable-iron hook having the spherical cavity in its end, in combination with the eye or link having the spherical head seated and confined within the cavity in the hook, as shown and described.

JAMES E. STUDLEY.

Witnesses:
A. T. GLAZE,
H. EVANS.